(12) United States Patent
Takase et al.

(10) Patent No.: US 11,422,039 B2
(45) Date of Patent: Aug. 23, 2022

(54) SENSOR UNIT

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); SUMITOMO ELECTRIC PRINTED CIRCUITS, INC., Shiga (JP)

(72) Inventors: Shinichi Takase, Mie (JP); Yoshifumi Uchita, Shiga (JP); Takayuki Tsumagari, Shiga (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); SUMITOMO ELECTRIC PRINTED CIRCUITS, INC., Shiga (JP)

( * ) Notice: Subject to any disclaimer, the term of this patent is extended or adjusted under 35 U.S.C. 154(b) by 214 days.

(21) Appl. No.: 16/754,438

(22) PCT Filed: Oct. 5, 2018

(86) PCT No.: PCT/JP2018/037319
§ 371 (c)(1),
(2) Date: Apr. 8, 2020

(87) PCT Pub. No.: WO2019/073917
PCT Pub. Date: Apr. 18, 2019

(65) Prior Publication Data
US 2021/0148766 A1 May 20, 2021

(30) Foreign Application Priority Data
Oct. 12, 2017 (JP) .............................. JP2017-198423

(51) Int. Cl.
*G01K 1/16* (2006.01)
*H01M 10/48* (2006.01)
*G01K 1/143* (2021.01)

(52) U.S. Cl.
CPC ............... *G01K 1/16* (2013.01); *G01K 1/143* (2013.01); *H01M 10/486* (2013.01)

(58) Field of Classification Search
CPC ........ G01K 1/16; G01K 1/143; H01M 10/486
See application file for complete search history.

(56) References Cited

U.S. PATENT DOCUMENTS 5,112,246 A * 5/1992 Kawase ............... H01R 13/629
439/489
5,464,353 A * 11/1995 Saijo .................. H01R 13/6272
439/489

(Continued)

FOREIGN PATENT DOCUMENTS

JP S58-054690 Y2 12/1983
JP 08/068699 3/1996

(Continued)

OTHER PUBLICATIONS

International Search Report issued in International Patent Application No. PCT/JP2018/037319, dated Nov. 20, 2018, along with an English translation thereof.

(Continued)

*Primary Examiner* — Nathaniel T Woodward
*Assistant Examiner* — Philip L Cotey
(74) *Attorney, Agent, or Firm* — Greenblum & Bernstein, P.L.C.

(57) ABSTRACT

A sensor unit disclosed herein is a sensor unit that is to be mounted in a housing section included in a device, and the sensor unit includes a FPC including a detection line and having flexibility, a temperature sensor connected to a (Continued)

connection portion of the detection line on a surface of the FPC, and an elastic member disposed on the surface of the FPC so as to be elastically deformable. The elastic member is to be elastically compressed within the housing section to press a first plate member mounted on a back surface of the FPC toward the device by a resilient force.

12 Claims, 17 Drawing Sheets

(56) References Cited

U.S. PATENT DOCUMENTS

| | | | | |
|---|---|---|---|---|
| 8,110,986 | B2* | 2/2012 | Yukinobu | H05B 33/10 |
| | | | | 313/506 |
| 9,307,663 | B2* | 4/2016 | Hasegawa | G01R 27/2605 |
| 10,218,120 | B2* | 2/2019 | Sone | H01R 13/518 |
| 10,530,069 | B2* | 1/2020 | Washio | H01R 13/684 |
| 2015/0346871 | A1* | 12/2015 | Yoneji | H03K 17/962 |
| | | | | 156/60 |
| 2016/0380319 | A1* | 12/2016 | Rhein | H01M 50/147 |
| | | | | 429/90 |
| 2018/0339667 | A1* | 11/2018 | Hiramitsu | B60R 16/0215 |
| 2019/0376852 | A1* | 12/2019 | Kobayashi | B32B 27/08 |
| 2020/0213772 | A1* | 7/2020 | Hasegawa | H04R 1/06 |
| 2021/0148766 | A1 | 5/2021 | Takase et al. | |

FOREIGN PATENT DOCUMENTS

| | | |
|---|---|---|
| JP | 2003-229110 | 8/2003 |
| JP | 2013-251294 A | 12/2013 |
| JP | 2015-069738 | 4/2015 |
| JP | 2015-078851 A | 4/2015 |
| JP | 2016-149249 | 8/2016 |
| JP | 2019-74326 | 5/2019 |
| JP | 6799518 | 12/2020 |
| WO | 2016/129349 | 8/2016 |
| WO | 2017/082228 | 5/2017 |

OTHER PUBLICATIONS

International Preliminary Report on Patentability, Report issued in International Patent Application No. PCT/JP2018/037319, dated Apr. 14, 2020.

* cited by examiner

SENSOR UNIT

TECHNICAL FIELD

The technology disclosed herein relates to a sensor unit.

BACKGROUND ART

For example, a battery device including a temperature sensor that is described in Japanese Unexamined Patent Application Publication No. 2003-229110 (Patent Document 1 listed below) has been known. The temperature sensor of the battery device is fixed to the temperature detecting plate that is to be fixed to the casing. The temperature sensor is located near the surface the secondary battery that is arranged in the casing to detect temperature of the secondary battery.

RELATED ART DOCUMENT

Patent Document

[Patent Document 1] Japanese Unexamined Patent Application Publication. No. 2003-229110

SUMMARY OF THE INVENTION

Problem to be Solved by the Invention

In this type of device, the distance between the temperature sensor and the secondary battery is likely to vary due to the distance tolerance between the temperature detecting plate and the secondary battery. In some cases, the temperature sensor may not be located near the secondary battery and the temperature cannot be detected or the temperature sensor may be compressed between the temperature detecting plate and the secondary battery.

A technology for suppressing a decrease in detection accuracy of a sensor by contact between the sensor and a detection target with an appropriate pressure is disclosed herein.

Means for Solving the Problem

A sensor unit disclosed herein is a sensor unit that is to be mounted in a housing section of the detection object. The sensor unit includes a conductive path member including a conductive path and having flexibility and a band-like shape, a sensor element connected to the conductive path on a surface of the conductive path member, and an elastic member disposed on a surface of the conductive path member so as to be elastically deformable. The elastic member is to be elastically compressed within the housing section to press a back surface side portion of the conductive path member toward the detection object by a resilient force.

According to the sensor unit having such a configuration, the back surface side portion of the conductive path member that is connected to the sensor element is pressed toward the detection object by the resilient force of the elastic member. This suppresses the lifting of the back surface side portion of the conductive path member from the detection object and the sensor element is disposed close to the detection object. Therefore, the detection accuracy of the sensor element with respect to the detection object is less likely to be decreased. Even if a distance between the back surface side portion of the conductive path member and the detection object becomes small due to dimension tolerances, a pressing member is elastically compressed. Therefore, the sensor element is less likely to be compressed and damaged.

The sensor unit disclosed herein may include following configurations.

The elastic member that is elastically compressed is inserted into the housing section together with the conductive path member that is connected to the sensor element and is mounted on the detection object.

According to such a configuration, by inserting the elastic member that is elastically compressed into the housing section, the back surface side portion of the conductive path member can be contacted with the detection object with appropriate pressure by the resilient force of the elastic member. Thus, the sensor unit is mounted on the detection object.

The sensor element may be a temperature sensor detecting a temperature of the detection object and a plate member may be mounted on a back surface of the conductive path member.

According to such a configuration, when the conductive path member that is connected to the sensor element is inserted in the housing section, the conductive path member is less likely to be rubbed and damaged. Since the conductive path member is reinforced by the plate member, the operability of connecting the sensor element to the conductive path is improved.

The plate member may be a metal plate having high thermal conductivity.

According to such a configuration, the plate member exerts heat collecting effects of collecting heat of the detection object and the temperature of the detection object can be detected by the sensor element stably.

The sensor element may be covered with the elastic member.

According to such a configuration, the sensor element is less likely to be contacted with other component and damaged.

The elastic member may be disposed near and around the sensor element and on the conductive path member.

According to such a configuration, since the elastic member is disposed near and around the sensor element, the back surface side portion of the conductive path member that is connected to the sensor element can be surely contacted with the detection object with appropriate pressure compared to a configuration including the elastic member far away from the sensor element.

A mold section made of resin and covering the sensor element may be disposed between the elastic member and the sensor element.

According to such a configuration, the sensor element can be protected from other components by the mold section.

A cover covering a whole elastic member and the sensor element may be disposed on a portion of the elastic member on an opposite side from the conductive path member.

According to such a configuration, the sensor element can be protected from other components by the cover when the sensor unit is inserted into the housing section. When the elastic member is arranged in the housing section, the whole elastic member is elastically compressed evenly the cover. Therefore, the back surface side portion of the conductive path member that is connected to the sensor element can be contacted with the detection object evenly.

The cover may include a body section that is closely contacted with the conductive path member and a guide section that extends from a front edge of the body section with respect to an insertion direction into the housing section toward the conductive path member while being inclined.

According to such a configuration, when the elastic member is inserted into the housing section, the elastic member is guided smoothly by the guide section. This improves mounting operability of the sensor unit.

The conductive path member may include a bending portion that extends from a position where the elastic member is disposed so as to be bent and a second elastic member may be disposed on the surface of the conductive path member via the bending portion, and the second elastic member is to be disposed on top of the elastic member.

According to such a configuration, the bending portion is bent such that the second elastic member is disposed on top of the elastic member and the sensor element is protected from other components by the second elastic member. Namely, compared to a configuration including the second elastic member as a separate component, the number of components is reduced and the management of the components and the mounting operability are improved.

A protection plate may mounted on a back surface of a portion of the conductive path member on which the second elastic member is disposed.

According to such a configuration, when the second elastic member that is disposed on top of the elastic member is inserted into the housing section, the conductive path member is less likely to be rubbed and damaged.

The housing section may include an opening through which the sensor unit is inserted and a stopper at the opening. The stopper may stop the elastic member in an inserting/removing direction of the elastic member when the sensor unit reaches a correct position within the housing section.

According to such a configuration, the sensor unit is less likely to be out of the housing section of the detection object.

Advantageous Effects of Invention

According to the technology disclosed herein, a decrease in detection accuracy of a sensor is suppressed by contact between the sensor and a target to be detected with an appropriate pressure.

MODES FOR CARRYING OUT THE INVENTION

First Embodiment

A first embodiment according to the technology described herein will be described with reference to FIGS. 1 to 4.

In the embodiment section, a sensor unit 20 to be mounted on a device 10 that is to be mounted in an industrial printer or an industrial robot will be described as an example.

The device 10 includes a housing section 14 on an upper surface 12A that is an outer surface of the device 10. The housing section 14 houses the sensor unit 20.

Figure 1:
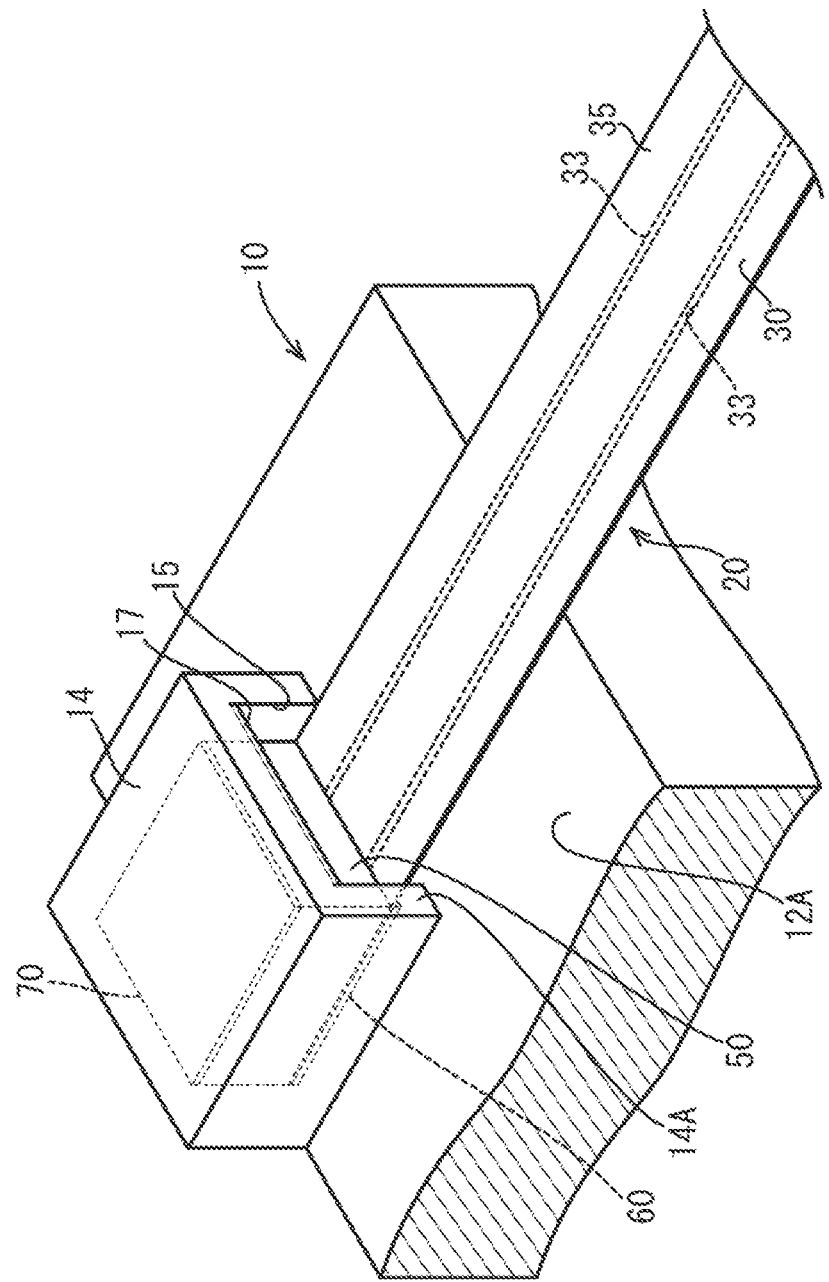
FIG. 1 is a perspective view illustrating a temperature sensor unit according to a first embodiment that is mounted in a housing section of a device.
Figure 2:
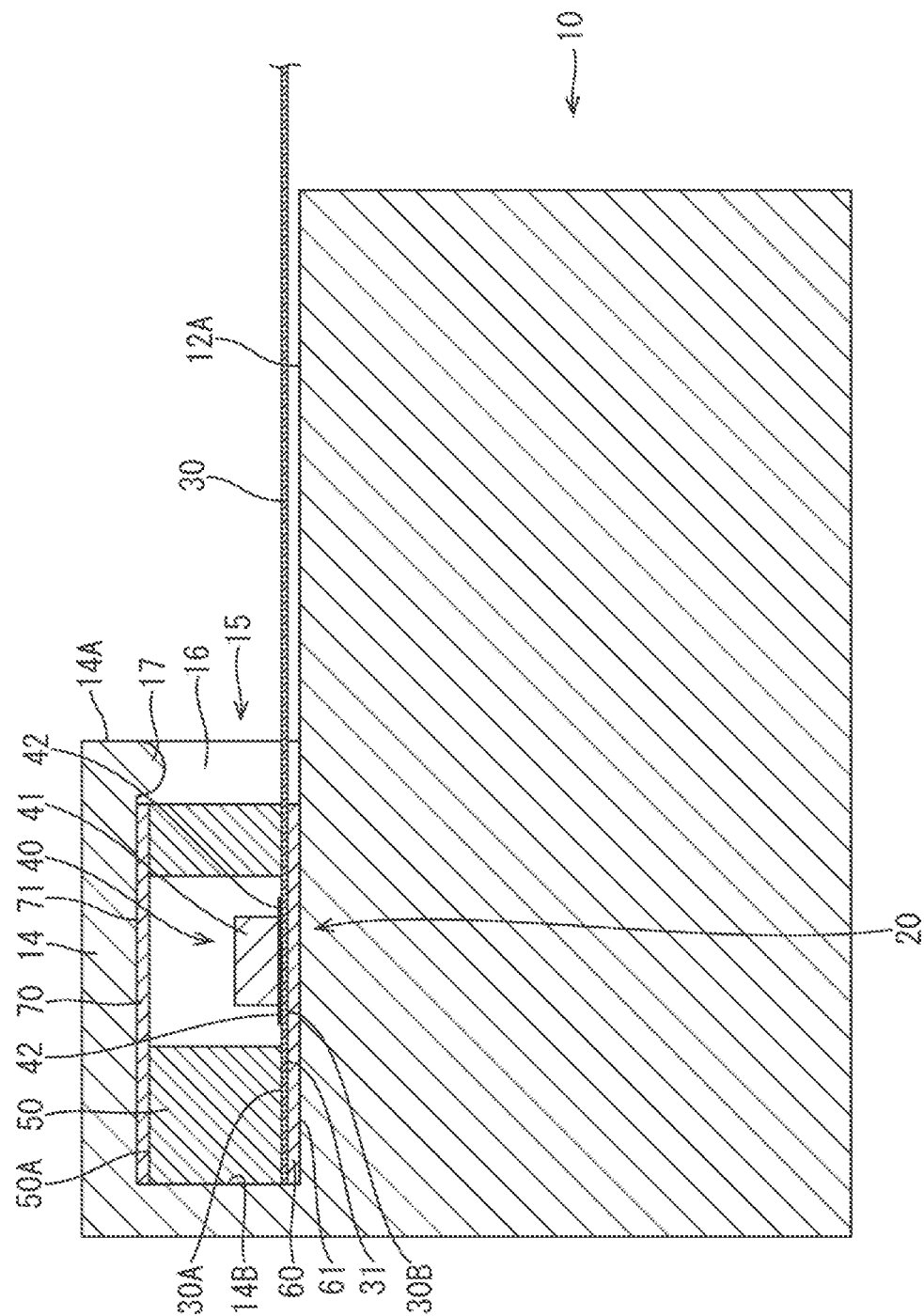
FIG. 2 is a cross-sectional view illustrating the temperature sensor unit that is mounted in the housing section.
Figure 3:
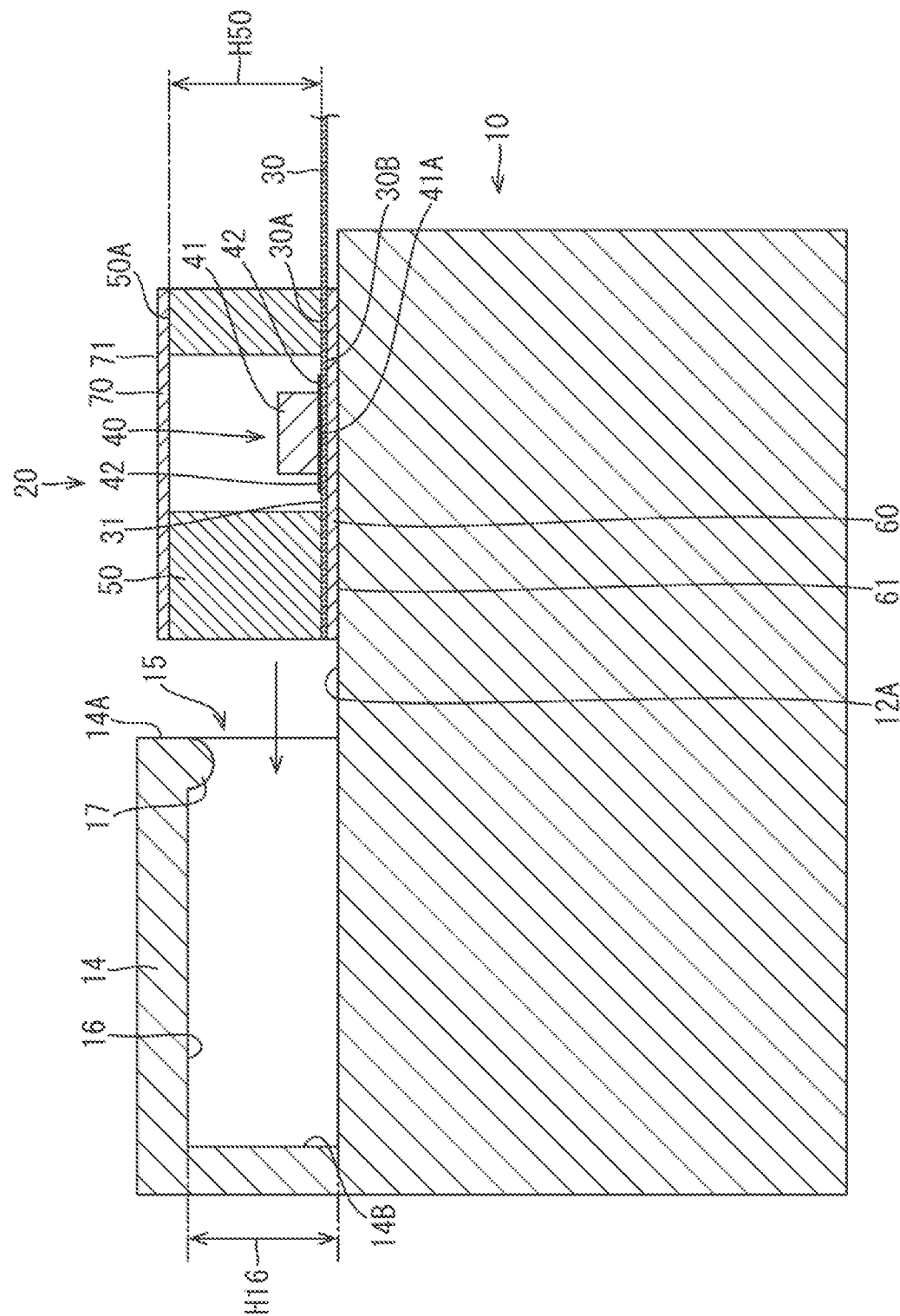
FIG. 3 is a cross-sectional view illustrating the temperature sensor before it is mounted in the housing section.

As illustrated in FIGS. 2 and 3, the housing section 14 includes an opening 15 on a rear surface 14A that is a side surface of the housing section 14 and is formed in a hood shape of a flat box. The opening 15 of the housing section 14 formed in a substantially laterally-long quadrangular shape with the upper surface 12A of the device 10. The sensor unit 20 is inserted through the opening 15 and arranged in an inner space 16 of the housing section 14.

The housing section 14 includes a unit stopper 17 (one example of a stopper) on an upper edge of the opening 15. The unit stopper 17 protrudes downward. The unit stopper 17 has a round shape and extends over an entire width of the opening 15.

Figure 4:
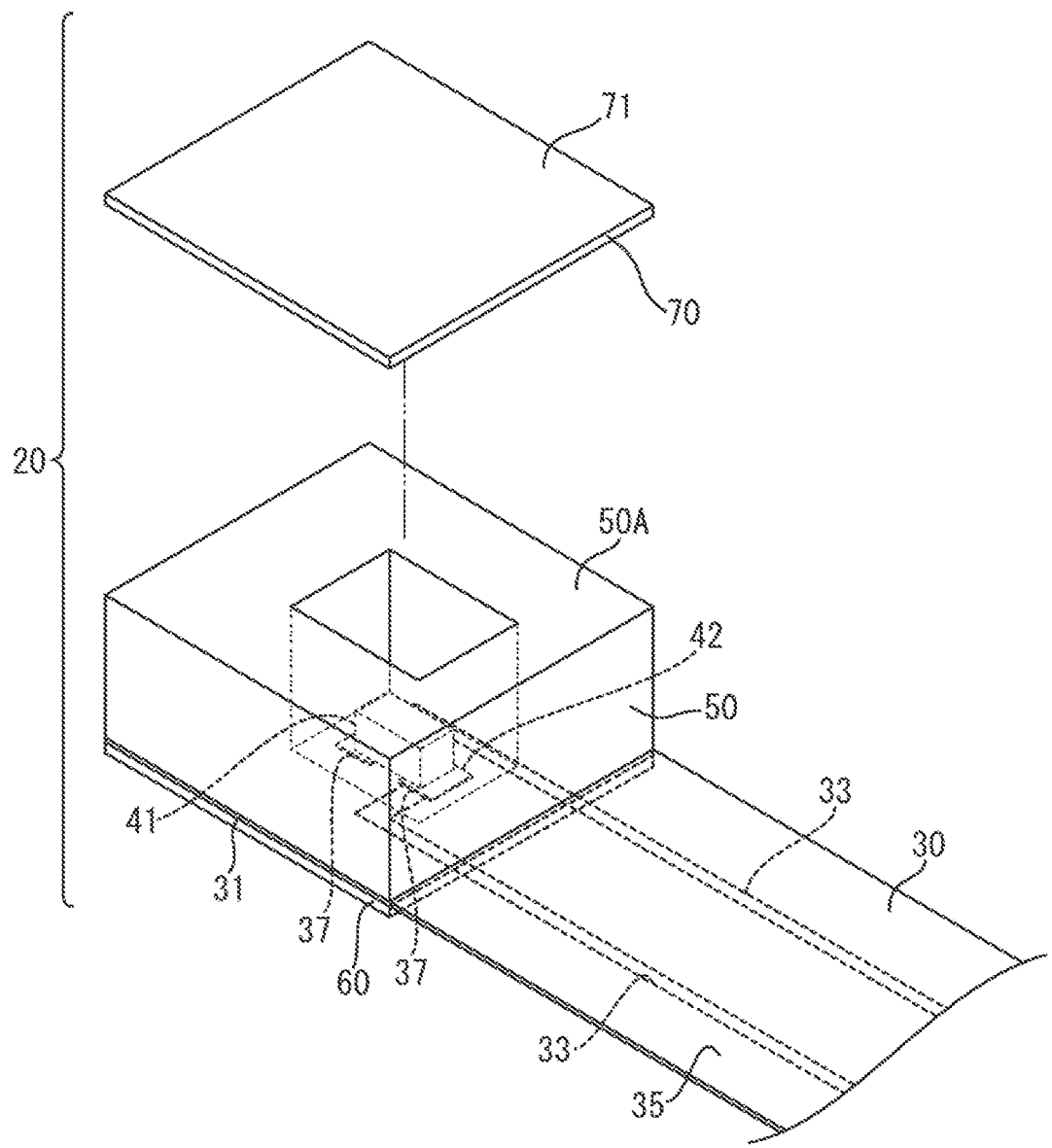
FIG. 4 is a perspective view illustrating the temperature sensor unit before a protection plate is mounted on an elastic member.

As illustrated in FIGS. 2 to 4, the sensor unit 20 includes a flexible printed circuit board 30 (hereinafter, referred to as a FPC) (one example of a conductive path member) having a hand-like shape, a temperature sensor 40 (one example of a sensor element) connected to a front end portion 31 that is one end portion of the FPC 30 (a left end portion in FIG. 3), an elastic member 50 disposed near and around the temperature sensor 40, a first plate member 60 (one example of a plate member) mounted on the FPC 30, and a second plate member 70 (one example of a cover) mounted on the elastic member 50.

The FPC 20 is formed by covering a pair of detection lines 33 (one example of a conductive path) with an insulating film 35 that has a band-like shape and is wider than the pair of detection lines 33. The pair of detection lines 33 are made of a copper foil and extend in a front-rear direction. The FPC 30 includes a pair of connection portions 37 on a surface 30A that is an upper surface of the front end portion 31 of the FPC 30. The connection portions 37 are exposed portions of the pair of detection lines 33. The pair of connection portions 37 are formed by removing the insulating film 35.

On the other hand, the pair of detection lines 33 are connected to a control unit, which controls the device 10 and is not illustrated, at a rear end portion (not illustrated) of the FPC 30.

As illustrated in FIGS. 3 and 4, the temperature sensor 40 includes a sensor main section 41 having a substantially square shape and a pair of lead members 42 at two edges of the sensor main section 41 with respect to a long-side direction thereof. The pair of lead members 42 project from a lower surface 41A of the sensor main section 41 in directions so as to be away from each other. The temperature sensor 40 is electrically connected to the pair of detection lines 33 by connecting the pair of lead members 42 to the pair of connection portions 37 on the FPC 30, respectively, with soldering. Accordingly, a detection signal from the temperature sensor 40 is input to the control unit via the pair of detection lines 33 of the FPC 30.

After the pair of lead members 42 are connected to the pair of connection portions 37, respectively, the sensor main section 41 is directly on a surface 30A of the FPC 30.

The elastic member 50 is made of soft elastic material having elasticity such as urethane resin, silicon resin, rubber, foamed resin and foamed rubber thereof. As illustrated in FIGS. 3 and 4, the elastic member 50 has a substantially quadrangular plan view frame shape having a dimension substantially same as a width dimension of the FPC 30. The elastic member 50 is disposed close to the temperature sensor 40 so as to surround side surfaces along an entire periphery of the temperature sensor 40. The elastic member 50 is bonded to the surface 30A of the front end portion 31 of the FPC 30 with known adhesive, for example.

The elastic member 50 has a height dimension H50 (a vertical dimension in FIG. 3) that is greater than a height dimension H16 of the inner space 16 of the housing section 14 and a height dimension of the temperature sensor 40. When the sensor unit 20 is mounted in the housing section 14, the elastic member 50 is completely stored in the housing section 14 while being compressed in the height direction within the inner space 16 of the housing section 14. The elastic member 50 that is elastically compressed within the housing section 14 has a height dimension greater than the height dimension of the temperature sensor 40.

More in detail, when the sensor unit 20 is mounted in the housing section 14, the elastic member 50 is elastically deformed so as to be depressed in the height direction. Then, the elastic member 50 is inserted into the inner space 16 of the housing section 14 through the opening 15 of the housing section 14 while being elastically deformed. When the sensor unit 20 reaches a front portion 14B of the housing section 14 and is inserted in a correct position, the elastic member 50 is moved and passes the unit stopper 17 at the opening 15 and is arranged in the housing section 14 on the front portion 14B side with respect to the unit stopper 17.

After the elastic member 50 is moved and passes the unit stopper 17, the elastic member 50 elastically restores its original shape slightly in the height direction; however, the elastic member 50 does not restore its original shape completely and is arranged in the housing section 14 while being compressed in the height direction. Namely, the FPC 30 and the first plate member 60 are pressed toward the device 10 by a resilient force of the elastic member 50 such that the temperature sensor 40 can be is contact with the device 10 via the FPC 30 and the first plate member 60.

When the elastic member 50 is arranged in the housing section 14, the elastic member 50 is stopped by the unit stopper 17 with respect to the front-rear direction that is an inserting/removing direction of the sensor unit 20 and the sensor unit 20 is less likely to be out of the housing section 14.

The first plate member 60 is mounted on a back surface 30B that is a lower surface of the front end portion 31 of the FPC 30. The first plate member 60 is a metal plate that has good thermal conductivity and is made of aluminum or an aluminum alloy. The first plate member 60 has a width dimension that is substantially same as a width dimension of the FPC 30. The first plate member 60 has a length dimension in the front-rear direction that is substantially same as a length dimension of the elastic member 50 in the front-rear direction. The first plate member 60 is bonded on a just back side of a position where the elastic member 50 is disposed while having the FPC 30 therebetween with a known adhesive, for example.

Namely, the first plate member 60 has a size that is substantially same as an outline size of the elastic member 50. The portion of the FPC 30 where the elastic member 50 is mounted is reinforced by the first plate member 60. A lower surface 61 of the first plate member 60 is processed to be a smooth surface so as to have good sliding properties and small friction coefficient.

The second plate member 70 is a flat plate member having a substantially same size as that of the first plate member 60. The second plate member 70 is bonded to an upper surface 50A of the elastic member 50 with a known adhesive so as to cover the temperature sensor 40 and the entire upper surface 50A of the elastic member 50 from an external side (an upper side). According to such a configuration, the temperature sensor 40 and the elastic member 50 are less likely to be contacted with other components and damaged. The second plate member 70 is a plate made of resin such as synthetic resin and an upper surface 71 of the second plate member 70 is processed to be a smooth surface having friction coefficient smaller than that of the upper surface 50A of the elastic member 50. The second plate member 70 may be a metal plate as long as the upper surface 71 of the second plate member 70 is processed to have friction coefficient smaller than that of the upper surface 50A of the elastic member 50.

The present embodiment has the configuration as described above and operations and effects of the sensor unit 20 will be described next.

When the sensor unit 20 is arranged in the inner space 16 of the housing section 14, the sensor unit 20 is arranged on the upper surface 12A of the device 10 first and the second plate member 70 is pressed from an upper side. When the second plate member 70 is pressed from the upper side, the whole elastic member 50 is elastically compressed evenly in a height direction thereof since the second plate member 70 covers the entire upper surface of the elastic member 50.

Next, the sensor unit 20 including the compressed elastic member 50 is inserted in the housing section 14. When the sensor unit 20 is inserted in the housing section 14, the sensor unit 20 is slid along the upper surface 12A of the device 10.

Since the first plate member 60 is mounted on the back surface of the sensor unit 20, the FPC 30 is less likely to be damaged by the sliding of the sensor unit 20 along the upper surface 12A of the device 10 and the sensor unit 20 can be slid smoothly because of the first plate member 60.

When the sensor unit is inserted in the housing section 14, the second plate member 70 is slid along the unit stopper 17 at the opening 15 of the housing section 14. The sensor unit 20 can be inserted in the housing section 14 smoothly since the upper surface 71 of the second plate member 70 is processed to have friction coefficient smaller than that of the upper surface 50A of the elastic member 50.

When the sensor unit 20 is inserted to the correct position in the housing section 14, the elastic member 50 is moved and passes the unit stopper 17 at the opening 15 and is arranged in the housing section 14 on the front portion 14B side with respect to the unit stopper 17. After the elastic member 50 is moved and passes the unit stopper 17, the elastic member 50 elastically restores its original shape slightly; however, the elastic member 50 does not restore its original shape completely and is arranged in the housing section 14 while being compressed in the height direction.

Thus, the elastic member 50 is elastically compressed within the housing section 14 to press the FPC 30 and the first plate member 60 toward the device 10 by the resilient force of the elastic member 50. Namely, the sensor unit can be held in the housing section 14 by the resilient force of the elastic member 50 by simply inserting the sensor unit 20 into the housing section 14. The sensor unit 20 may be lifted up within the housing section 14 due to dimension tolerances such as a manufacturing tolerance and a mounting tolerance. Such lifting of the sensor unit 20 is suppressed by the resilient force of the elastic member 50 and the temperature of the device 10 can be transferred to the temperature sensor 40 via the FPC 30 and the first plate member 60. Accordingly, the detection accuracy of the temperature sensor 40 is less likely to be decreased.

Further, the elastic member 50 is disposed close to the temperature sensor 40 so as to surround an entire periphery of the temperature sensor 40, and the first plate member 60, which is a flat plate, is mounted on the back surface 30B of the FPC 30. Therefore, the temperature sensor 40 is less likely to be lifted up with respect to the device 10 and the detection accuracy of the temperature sensor 40 is less likely to be decreased compared to a configuration including an elastic member that is arranged on only one side of the temperature sensor while being away from the temperature sensor or a configuration including an elastic member on which the first plate member of a flat plate is not mounted.

Thus, the configuration of the sensor unit 20 can be simplified compared to a configuration including a holding structure for holding the sensor unit within a housing section and a lifting-prevention structure for preventing lifting of the sensor unit within the housing section.

The sensor unit 20 is configured to be held in the housing section 14 by compressing the elastic member 50 in the height direction. The elastic member 50 is stopped by the unit stopper 17 with respect to the front-rear direction that is the inserting/removing direction of the sensor unit 20 and the sensor unit 20 is less likely to be out of the housing section 14.

Even if the height dimension of the inner space of the housing section is reduced due to the dimension tolerance, the elastic member 50 is designed such that the elastically compressed elastic member 50 has the height dimension greater than the height dimension of the temperature sensor 40 and therefore, the temperature sensor 40 is less likely to be compressed and damaged.

The elastic member 50 is depressed such that the FPC 30 and the first plate member 60 are pressed toward the device 10 and the temperature sensor 40 is configured to be contacted with the device 10 via the FPC 30 and the first plate member 60. However, if the thermal conductivity of the first plate member is low or the first plate member has unevenness on the lower surface, the temperature of the device 10 cannot be transferred stably to the temperature sensor 40.

The first plate member 60 is this embodiment is a metal flat plate having good thermal conductivity and therefore, heat of the device 10 is collected by the first plate member 60 and the temperature of the device 10 is transferred to the temperature sensor 40. Accordingly, the temperature sensor 40 can detect the temperature of the device 10 stably and the detection accuracy of the temperature sensor 40 can be improved.

Since the first plate member 60 reinforces the FPC 30, connection operability is improved when the pair of lead members 42 of the temperature sensor 40 is connected to the pair of connection portions 37 of the FPC 30, respectively.

As described above, according to the present embodiment, the elastic member 50, which is elastically deformable, is mounted on the surface 30A of the front end portion 31 of the FPC 30 and the FPC 30 and the first plate member 60 are pressed within the housing section 14 by the resilient force of the elastic member 50. Thus, the temperature sensor 40 can be contacted with the device 10 via the FPC 30 and the first plate member 60. Therefore, the temperature sensor 40 is less likely to be lifted up from the device 10 due to the manufacturing tolerance or the mounting tolerance. Accordingly, the detection accuracy of the temperature sensor 40 is less likely to be decreased.

The elastic member 50 is just attached to the FPC 30. Therefore, compared to a configuration in which a mounting seat is disposed on the FPC and an urging member is disposed on the mounting seat for preventing the lifting, the configuration of the sensor unit 20 can be simplified. Further, the sensor unit 20 can be reduced in size and the number of components.

Second Embodiment

Figure 5:
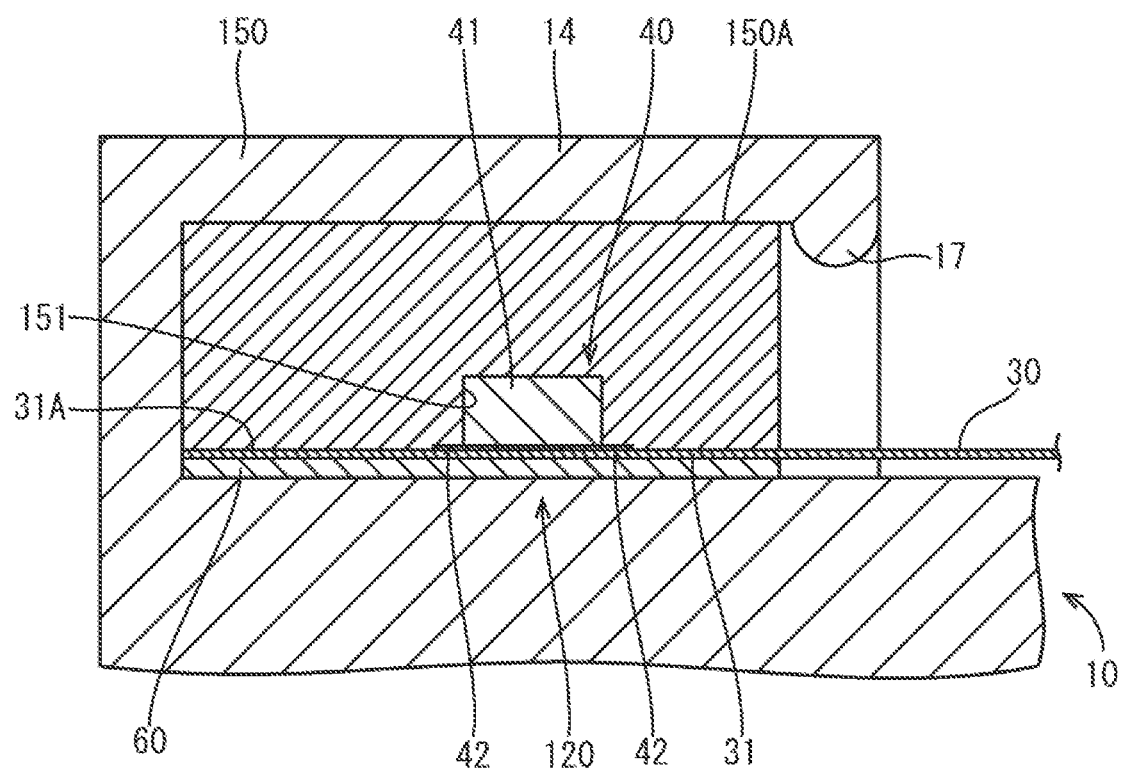
FIG. 5 is a cross-sectional view illustrating a temperature sensor unit according to a second embodiment that is mounted in a housing section of a device.
Figure 6:
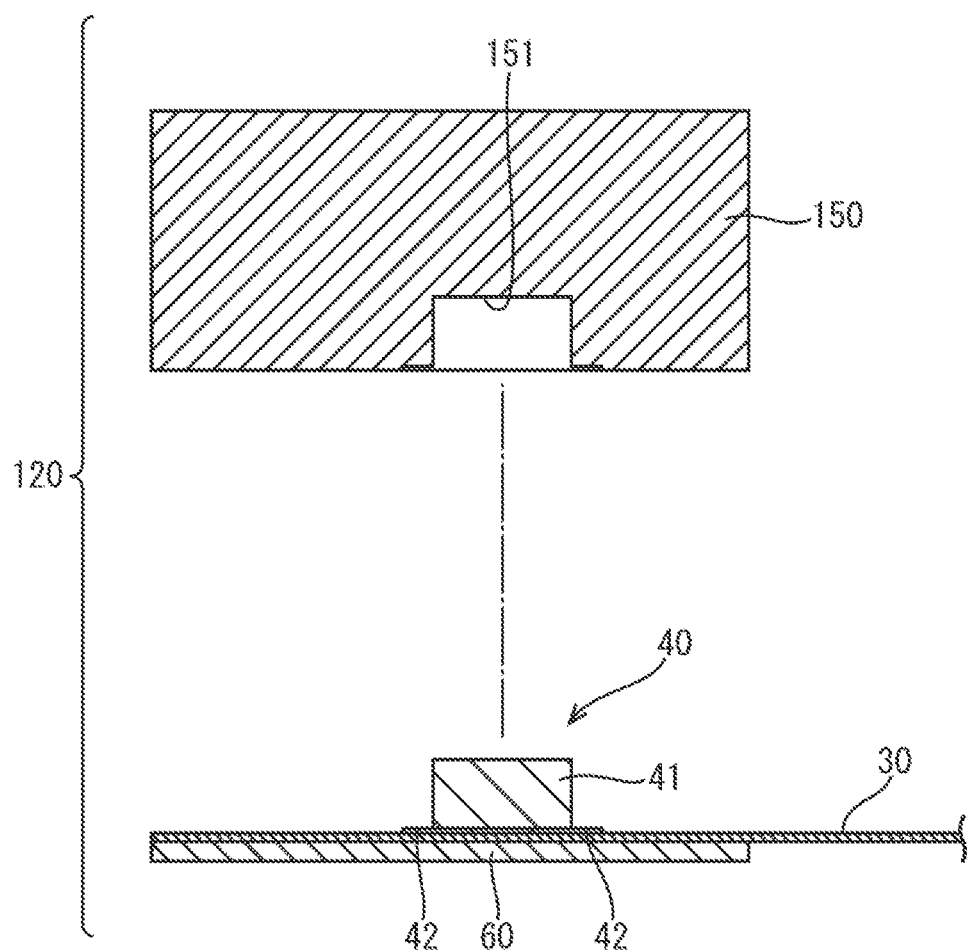
FIG. 6 is a cross-sectional view illustrating a FPC before mounting an elastic member on the FPC where a temperature sensor is fixed.

Next, a second embodiment will be described with reference to FIGS. 5 and 6.

The second embodiment does not include the second plate member 70 of the sensor unit 20 in the first embodiment and the shape of the elastic member 50 is altered. Configurations, operations, and effects similar to those of the first embodiment will not be described. The same symbols are used for the components having the same configurations as those of the first embodiment.

An elastic member 150 of a sensor unit 120 according to the second embodiment has a substantially square block shape and the elastic member 150 includes a sensor housing section 151 in a middle and lower edge portion thereof. The sensor housing section 151 that houses the temperature sensor 40 is a recess in the middle and lower edge portion of the elastic member 150.

The elastic member 150 is mounted on the FPC 30 such that the sensor housing section 151 stores the temperature sensor 40 therein from the upper side. When the elastic member 150 is mounted on the FPC 30, the temperature sensor 40 and the whole front end portion 31 of the FPC 30 are covered with the elastic member 150.

An upper surface 150A of the elastic member 150 is processed to be a smooth surface having small friction coefficient and good smoothness.

Namely, according to the present embodiment, the number of components of the sensor unit 120 can be further reduced while protecting the FPC 30 and the temperature sensor 40.

Third Embodiment

Figure 7:
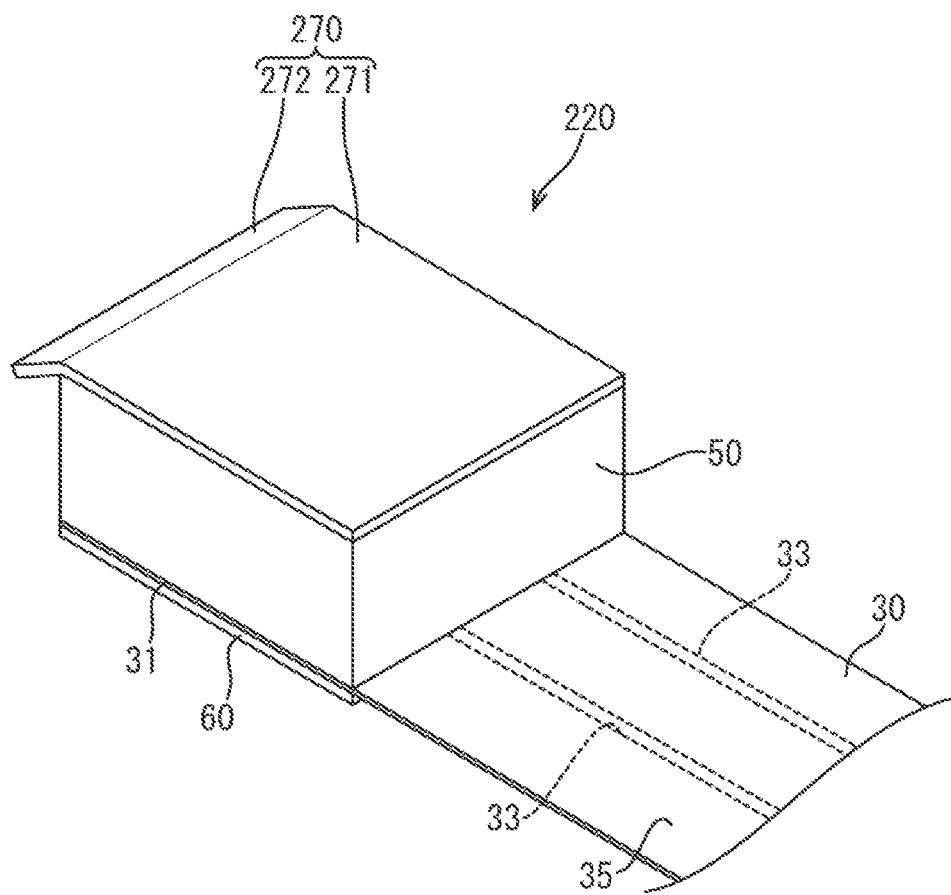
FIG. 7 is a perspective view of a temperature sensor unit according to a third embodiment.
Figure 8:
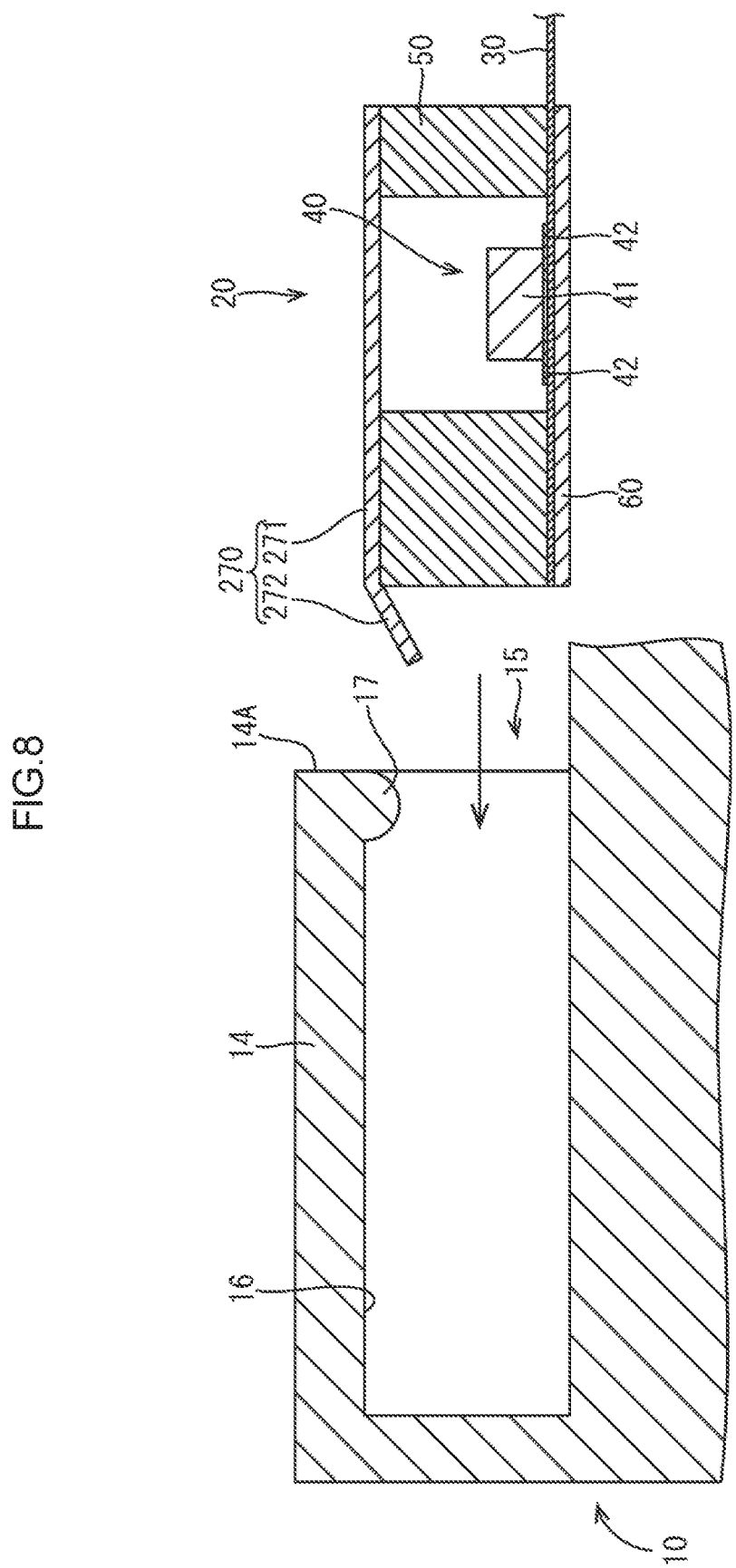
FIG. 8 cross-sectional view illustrating the temperature sensor unit before it is mounted in a housing section.
Figure 9:
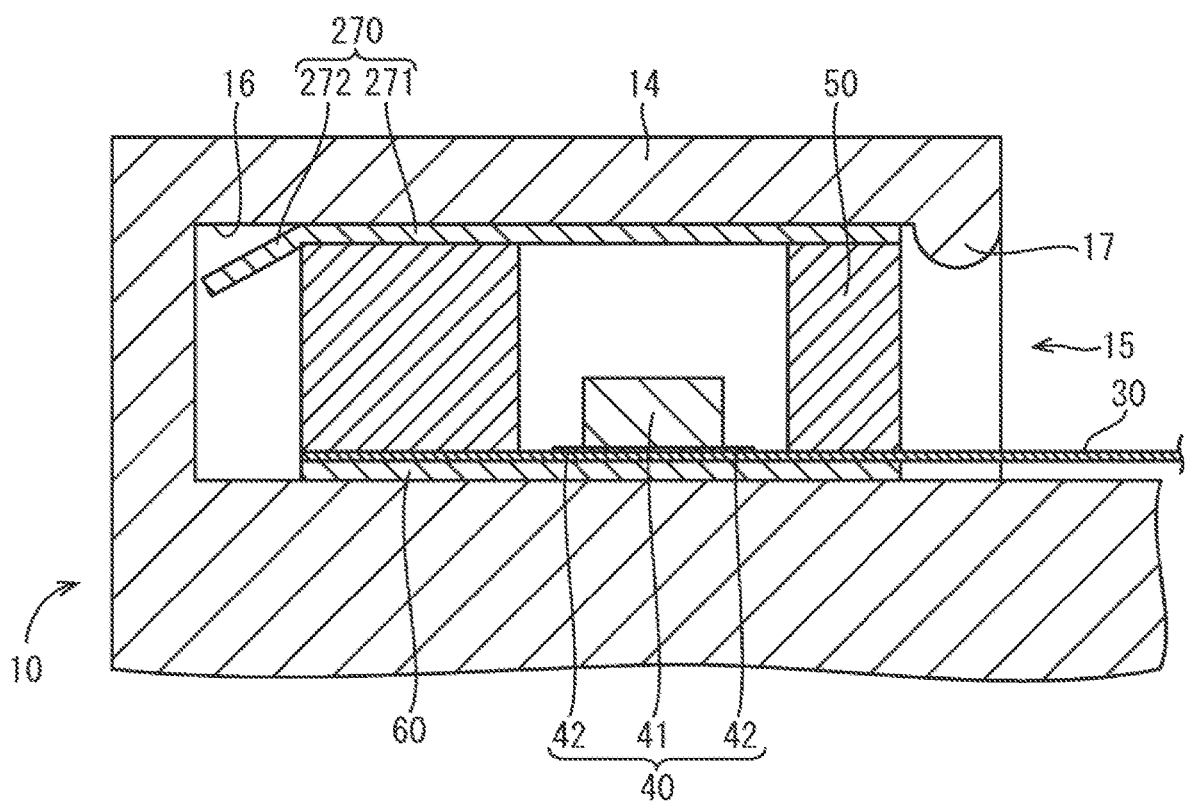
FIG. 9 is a cross-sectional view illustrating the temperature sensor unit that is mounted in the housing section of a device.
Figure 10:
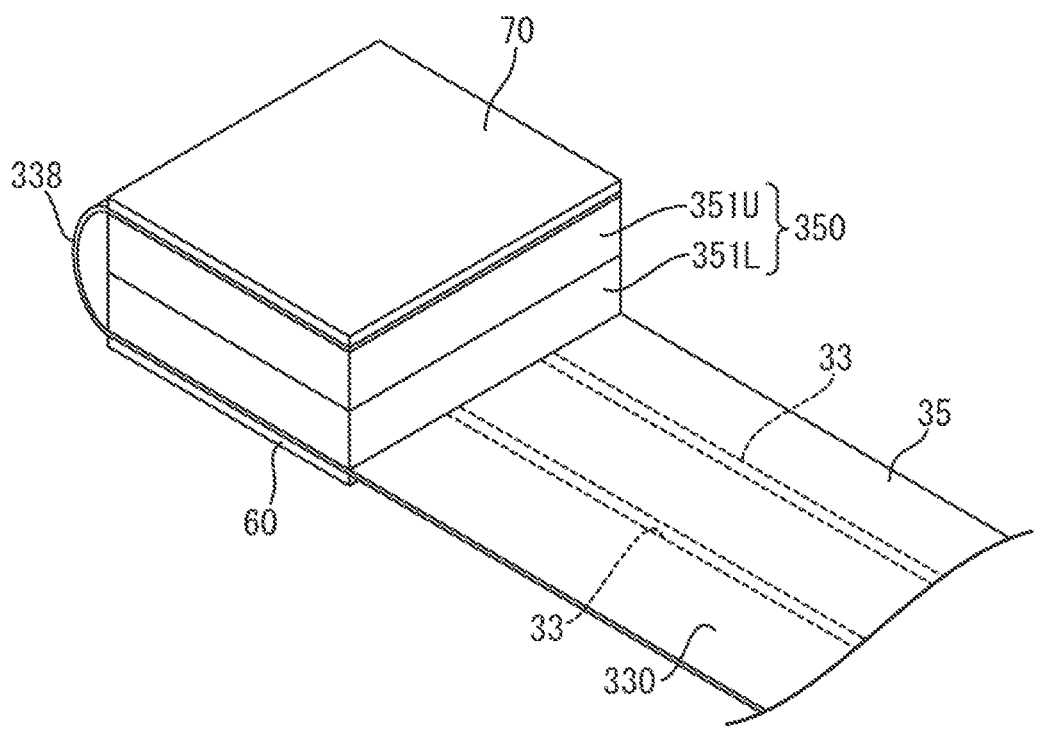
FIG. 10 is a perspective view illustrating a temperature sensor unit according to a fourth embodiment.
Figure 11:
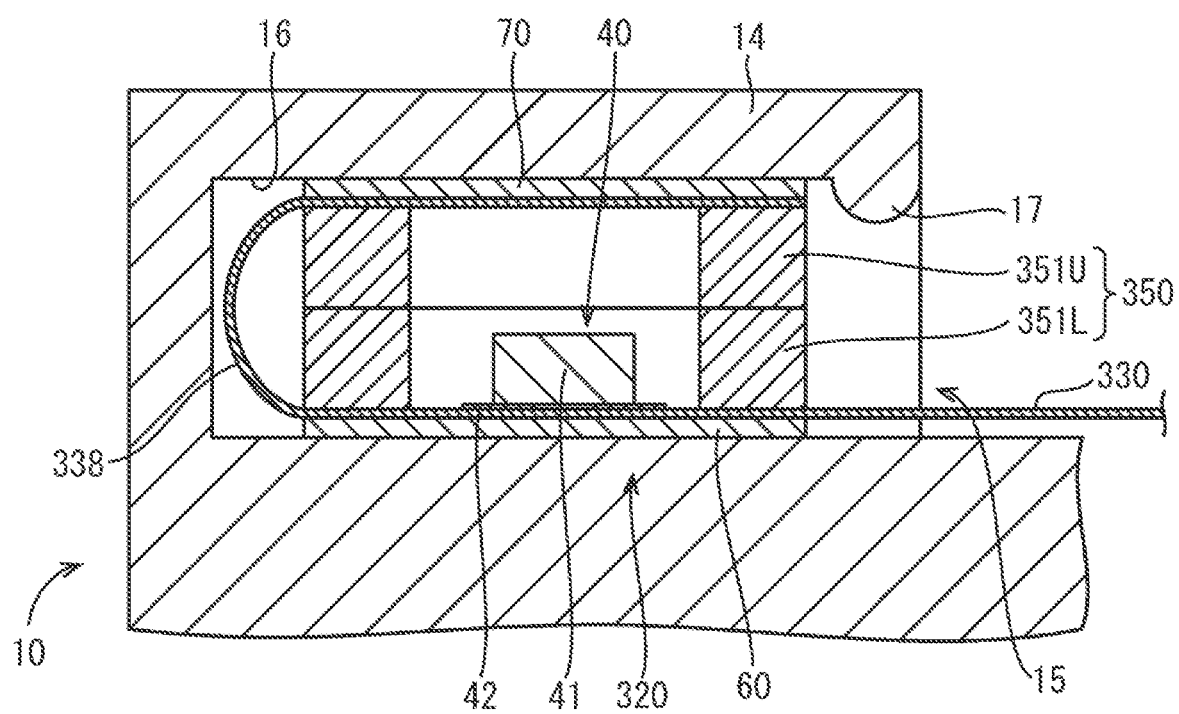
FIG. 11 is a cross-sectional view illustrating the temperature sensor unit that is mounted in a housing section of a device.

Next, a third embodiment will be described with reference to FIGS. 7 to 9.

In a configuration of the third embodiment, the shape of the second plate member 70 of the sensor unit 20 in the first embodiment is altered and a depth dimension of the housing section 14 is increased. Configurations, operations, and effects similar to those of the first embodiment will not be described. The same symbols are used for the components having the same configurations as those of the first embodiment.

A second plate member 270 of a sensor unit 220 according to the third embodiment includes a body section 271 and a guide section 272. The body section 271 is mounted on the upper surface 50A of the elastic member 50 and the guide section 272 extends from the body section 271 while being inclined.

The body section 271 has a substantially square flat plate shape that covers the whole upper surface 50A of the elastic member 50.

The guide section 272 is a wide flat plate that is inclined downward as the guide section 272 extends from a front edge portion of the body section 271 that is to be inserted in the housing section toward the front side. The guide section 272 extends over an entire width of the body section 271.

Therefore, when the sensor unit 220 is inserted in the housing section through the opening 15 of the housing section 14, the sensor unit 220 is slid toward the opening 15 of the housing section 14 and the guide section 272 of the second plate member 270 of the sensor unit 220 comes in contact with the unit stopper 17 of the housing section 14.

In the configuration of this embodiment, it may not be necessary to compress the elastic member 50 and the second plate member 270 may be pressed to compress the elastic member 50 when the sensor unit 220 is slid toward the opening 15 of the housing section 14.

Thereafter, if the sensor unit 220 is inserted into the housing section 14, the guide section 272 is pressed by the unit stopper 17 and the elastic member 50 is compressed. At the same time, the sensor unit 220 is guided into the housing section 14.

Namely, when the sensor unit 220 is inserted in the housing section 14, the sensor unit 220 can be guided into the housing section 14 smoothly by the guide section 272.

Fourth Embodiment

Next, a fourth embodiment will be described with reference to FIGS. 10 to 13.

In a configuration of the fourth embodiment, the sensor unit 20 in the first embodiment is altered. Configurations, operations, and effects similar to those or the first embodiment will not be described. The same symbols are used for the components having the same configurations as those of the first embodiment.

Figure 12:
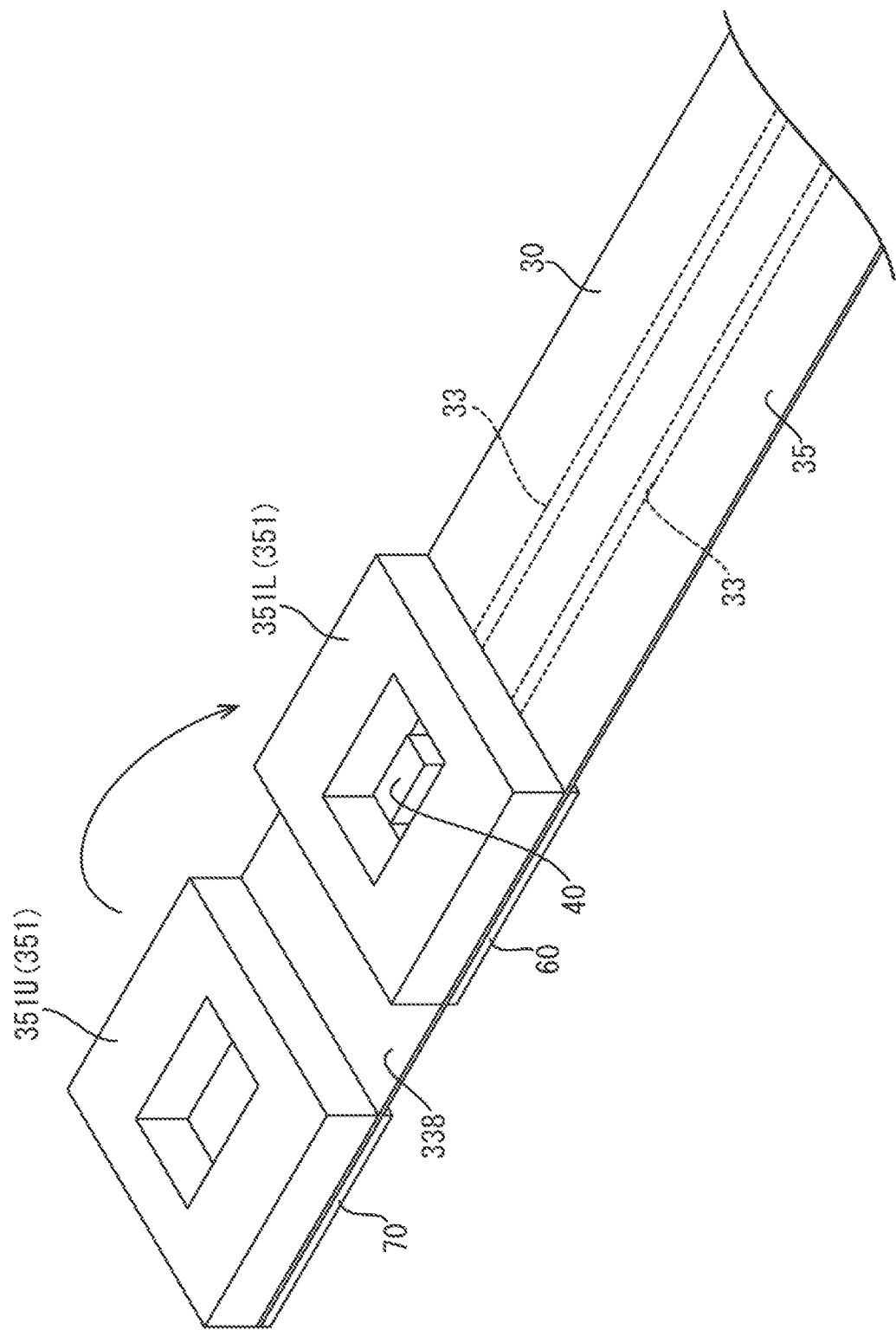
FIG. 12 is a perspective view illustrating the temperature sensor unit before a bending portion is folded.
Figure 13:
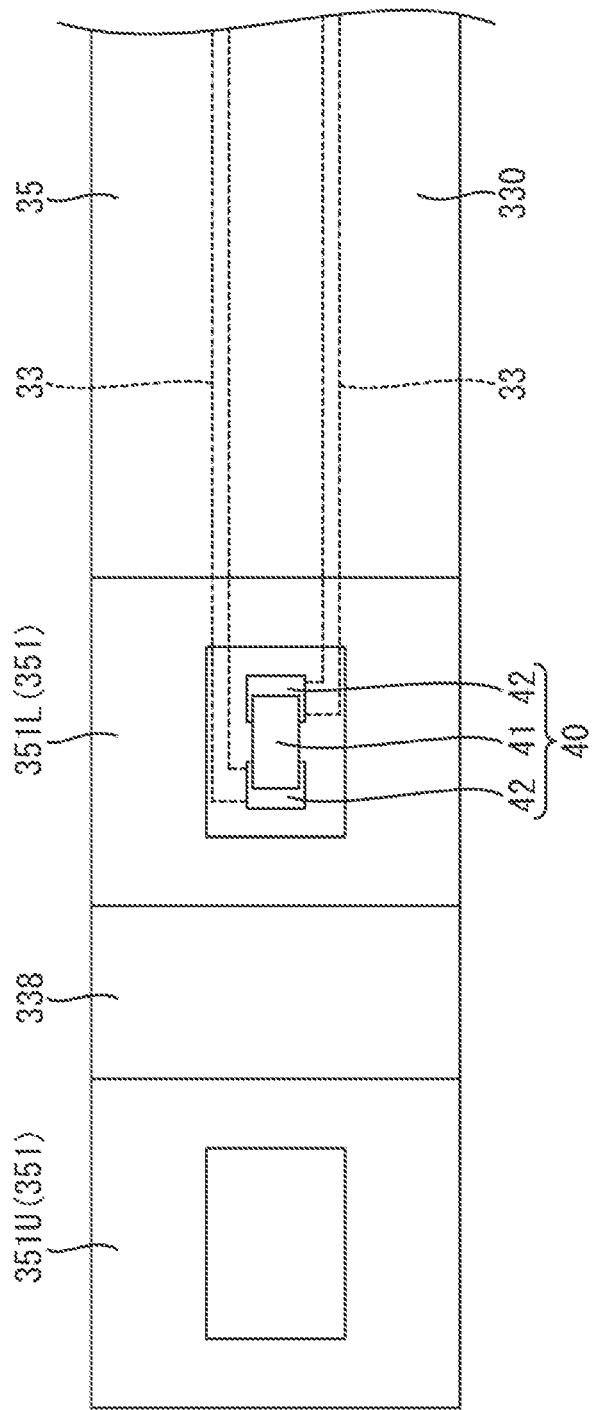
FIG. 13 plan view illustrating the temperature sensor unit before the bending section is folded.

As illustrated in FIG. 12, a sensor unit 320 in the fourth embodiment includes a FPC 330, the temperature sensor 40 that is connected to the FPC 330, an elastic member 350, the first plate member 60 mounted on the FPC 330, and the second plate member 70 (one example of a protection plate) mounted on the FPC 330. The elastic member 350 is disposed close to and around the temperature sensor 40.

The temperature sensor 40 is mounted on a rear side of the front end portion of the FPC 330.

The elastic member 350 includes two separated elastic members 351 each of which has a height dimension that is a half of the height dimension of the elastic member 50 in the first embodiment. The elastic member 350 includes the two separated elastic members 351 that are disposed on top of each other in the height direction.

One of the separated elastic members 351 is a first separated elastic member 351L (one example of the elastic member) that is disposed close to the temperature sensor 40 to surround a whole side periphery of the temperature sensor 40. The first separated elastic member 351L is bonded to a surface 330A of the FPC 330 with a known adhesive, for example.

Another one of the separated elastic members 351 is a second separated elastic member 351U (one example of a second elastic member) that is disposed on the surface 330A of the front end portion of the FPC 330 and is bonded with a known adhesive, for example.

A length dimension of a portion of the FPC 330 between the first separated elastic member 351L and the second separated elastic member 351U is set greater than the height dimension of the two separated elastic members 351 that are disposed on top of each other. The portion of the FPC 330 is a bending portion 338 that can be folded.

The bending portion 338 is bent such that the two separated elastic members 351 can be disposed on top of each other.

The first plate member 60 is below the first separated elastic member 351L via the FPC 330 and bonded with a known adhesive, for example. The second plate member 70 is below the second separated elastic member 351U via the FPC 330 and bonded with a known adhesive, for example.

Therefore, a sensor unit 320 is configured by folding the FPC 330 at the bending portion 338 such that the second separated elastic member 351U is overlapped with the first separated elastic member 351L.

The first separated elastic member 351L and the second separated elastic member 351U are configured such that the separated elastic members 351 are configured not to move each other by friction; however, they may be bonded to each other with a known adhesive.

Therefore, according to the present embodiment, after confirming the condition of the temperature sensor 40, the two separated elastic members 351 are overlapped with each other to mount the sensor unit 320 in the housing section 14.

According to the present embodiment, the first separated elastic member 351L and the second separated elastic member 351U are connected to each other by the bending portion 338. Therefore, if it is necessary to cover the temperature sensor 40 after checking the condition of the temperature sensor 40, the number of components is reduced and the management of the components and the mounting operability are improved compared to a configuration including the second plate member and the second separated elastic member as the separate components.

Fifth Embodiment

Figure 14:
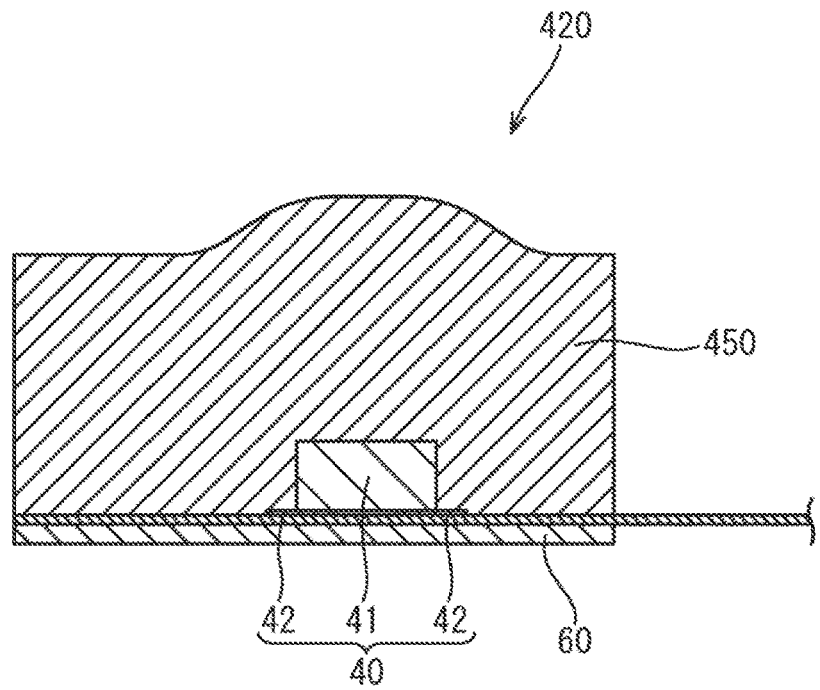
FIG. 14 is a cross-sectional view illustrating a temperature sensor unit according to a fifth embodiment.
Figure 15:
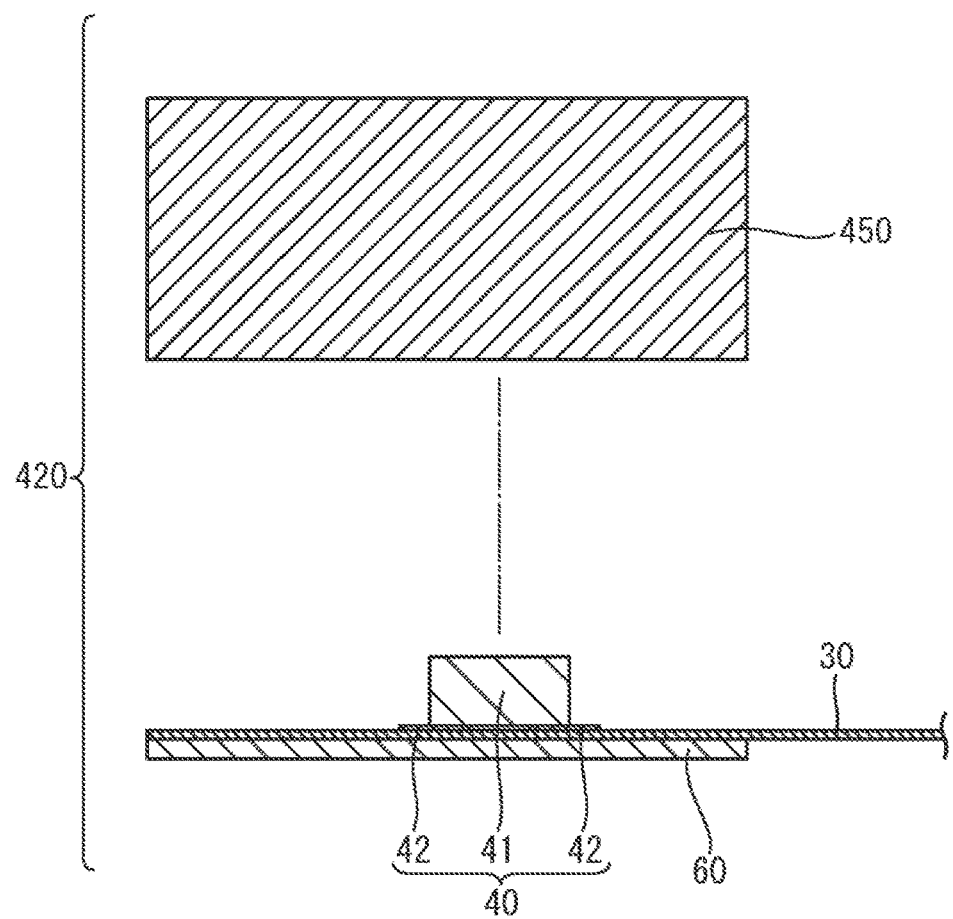
FIG. 15 is a cross-sectional view illustrating a FPC before an elastic member is mounted on the FPC where a temperature sensor is fixed.

Next, a fifth embodiment will be described with reference to FIGS. 14 and 15.

The fifth embodiment does not include the second plate member 70 of the sensor unit 20 in the first embodiment and a shape of the elastic member 50 is altered. Configurations, operations, and effects similar to those of the first embodiment will not be described. The same symbols are used for the components having the same configurations as those of the first embodiment.

An elastic member 450 of a sensor unit 420 in the fifth embodiment has a substantially square block shape and is mounted on the surface 30A of the FPC 30 so as to cover the temperature sensor 40 and the whole front end portion 31 of the FPC 30 from an upper side.

Therefore, when the elastic member 450 is mounted on the FPC 30, an upper surface of the portion of the elastic member 450 where the temperature sensor 40 is disposed is projected upward.

Namely, according to the present embodiment, the elastic member 450 is formed in a block shape and the elastic member 450 is just mounted on the FPC 30 where the temperature sensor 40 is mounted. Therefore, the processing operation of the elastic member 450 is quite simple. Namely, the number of operation steps for producing the sensor unit 420 can be reduced.

The elastic member 450 that has a projection projecting upward is made of soft elastic material having elasticity. Therefore, the temperature sensor 40 is not damaged by the elastic compression of the elastic member 450 in the height direction thereof.

Sixth Embodiment

Figure 16:
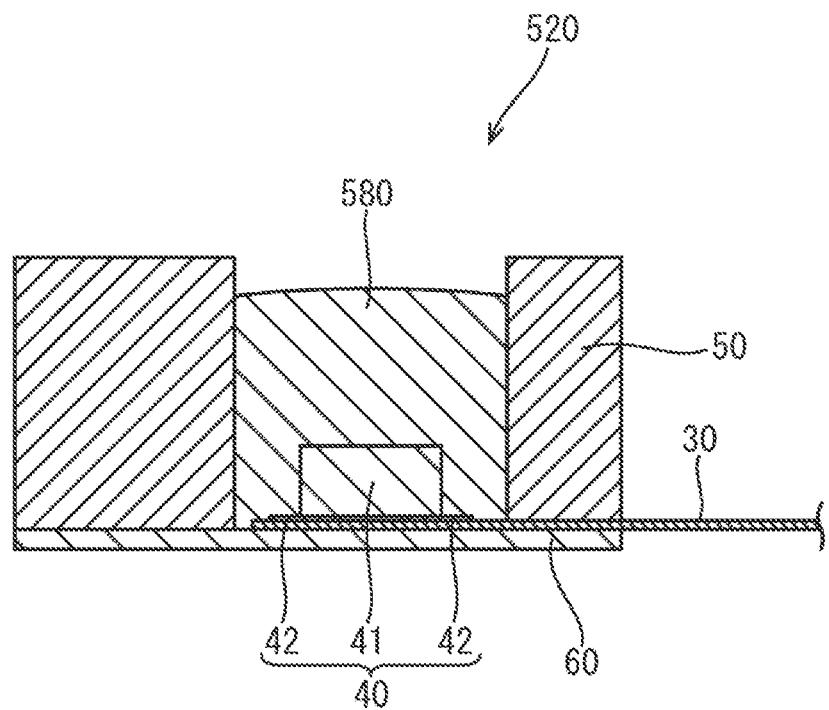
FIG. 16 is a cross-sectional view illustrating a temperature sensor unit according to a sixth embodiment.

Next, a sixth embodiment will be described with reference to FIG. 16.

The sixth embodiment does not include the second plate member 70 of the sensor unit 20 in the first embodiment and includes a mold section between the temperature sensor 40 and the elastic member 50. Configurations, operations, and effects similar to those of the first embodiment will not be described. The same symbols are used for the components having the same configurations as those of the first embodiment.

The mold section 580 of a sensor unit 520 in the sixth embodiment is obtained by supplying resin into a space between the temperature sensor 40 and the elastic member 50 and curing the resin. The mold section 580 closely contacted with the temperature sensor 40, the elastic member 50, and the surface 30A of the FPC 30.

The mold section 580 is designed to have a height dimension that is slightly smaller than the height dimension of the elastic member 50 and the elastic member 50 projects upward further than the mold section 580.

When the sensor unit 520 is arranged in the housing section 14, the mold section 580 is less likely to be contacted with the housing section 14 and the FPC 30 and the first plate member 60 are pressed toward the device 10 by the elastic member 50. Thus, the detection accuracy of the temperature sensor 40 is less likely to be decreased.

Since the temperature sensor 40 is completely covered with the mold section 580, liquid or dust that may enter from other components or the outside is less likely to be contacted with the temperature sensor 40. The detection accuracy of the temperature sensor 40 is less likely to be decreased.

Other Embodiments

The technology disclosed herein is not limited to the embodiments described above and illustrated in the drawings. For example, the following embodiments will be included in the technical scope of the technology.

In the above embodiments, the sensor unit 20, 120, 220, 320, 420, 520 is inserted into the housing section 14 through the opening 15 to mount the sensor unit 20, 120, 220, 320, 420, 520 in the housing section 14. However, the present technology is not limited to this configuration and the sensor unit may be covered from an upper side with a housing section of a box shape that opens downward and the housing section is mounted in the device. Thus, the sensor unit may be mounted in the housing section.

(2) In the above embodiments, the first plate member 60 is mounted on the back surface of the FPC 30, 330. However, the configuration is not limited thereto and a protection film may be bonded to the back surface 30B of the FPC 30 or an insulating film disposed on a lower surface of the FPC may be increased in a thickness thereof.

(3) In the above embodiments, the temperature sensor 40 is used as the sensor element. However, the present technology is not limited to this configuration and various sensors such as a vibration sensor and an angle sensor may be used as the sensor element.

(4) In the first and third embodiments, the second plate member 70 that is a resin plate is mounted on the upper surface 50A of the elastic member 50 as a cover. However, the configuration is not limited thereto and a protection film may be mounted on the upper surface of the elastic member as the cover.

(5) In the above embodiments, the elastic members 50, 150, 350 are made of soft elastic material having elasticity. However, the configuration is not limited thereto and the elastic member may be provided with coating to add waterproof properties to the elastic member and waterproof the sensor unit. The temperature sensor may be coated with resin to improve protecting performance, insulating properties, and waterproofing properties.

(6) In the above embodiments, the FPC 30, 330 is used as the conductive path member having flexibility. However, the present technology is not limited to this configuration and a flexible flat cable may be used as the conductive path member.

Figure 17:
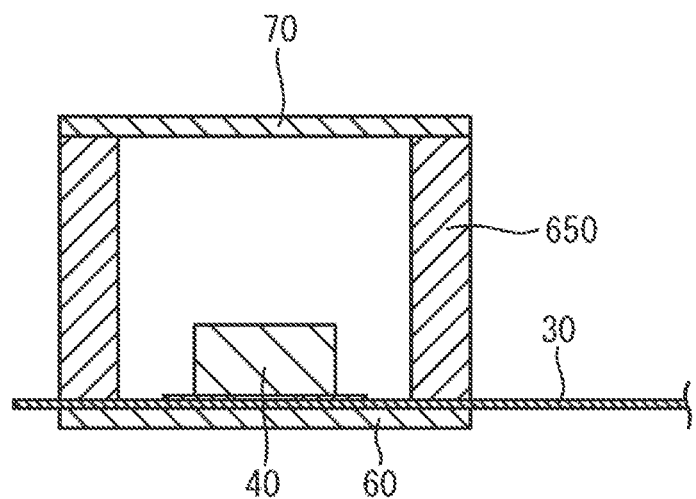
FIG. 17 is a cross-sectional view illustrating a temperature sensor unit according to another embodiment.
Figure 18:
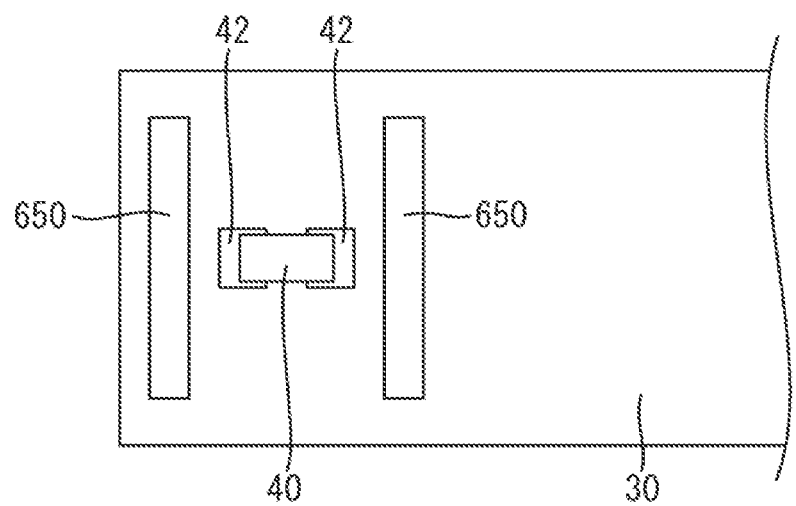
FIG. 18 is a plan view illustrating a FPC before protection plate is mounted on an elastic member that is fixed to the FPC.
Figure 19:
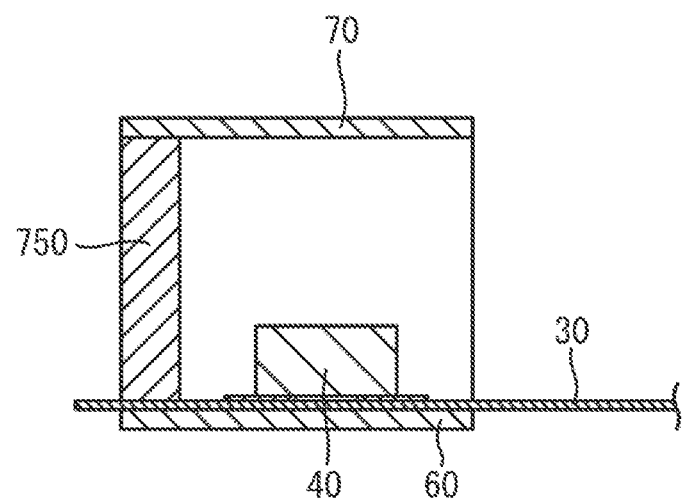
FIG. 19 is a cross-sectional view illustrating a temperature sensor unit according to another embodiment.
Figure 20:
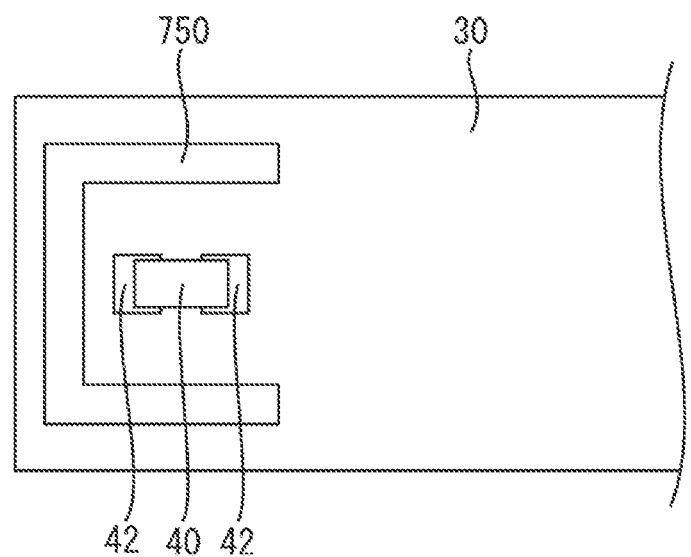
FIG. 20 is a plan view illustrating a FPC before a protection plate is mounted on an elastic member that is fixed to the FPC.

(7) In the above embodiments, the entire periphery of the temperature sensor is surrounded by the elastic member 50, 150, 350. However, the configuration is not limited thereto. As illustrated in FIGS. 17 and 18, an elastic member 650 may be configured such that no elastic member is provided on two side portions in a width direction. As illustrated in FIGS. 19 and 20, an elastic member 750 may be configured such that no elastic member is provided on a rear portion.

EXPLANATION OF SYMBOLS

10: device (one example of a detection object)
14: housing section
15: opening
17: unit stopper (one example of a stopper)
20, 120, 220, 320, 420, 520: sensor unit
33: detection line (one example of a conductive path)
30, 330: FPC (one example of a conductive path member)
40: temperature sensor (one example of a sensor element)
50, 150, 350: elastic member
60: first plate member (one example of a plate member)
70, 270: second plate member (one example of a cover, a protection plate)
271: body section
272: guide section
338: bending portion
351L: first separated elastic member (one example of an elastic member)

351U: second separated elastic member (one example of a second elastic member)

580: mold section

The invention claimed is:

1. A sensor unit to be mounted in a housing section included in a detection object, the sensor unit comprising:
a conductive path structure including a conductive path and having flexibility and a band-like shape;
a sensor element connected to the conductive path on a surface of the conductive path structure; and
an elastic structure disposed on the surface of the conductive path structure so as to be elastically deformable, the elastic structure is configured to be elastically compressed within the housing section to press a back surface side portion of the conductive path structure in a pressing direction toward the detection object by a resilient force, wherein
the sensor element and the elastic structure both protrude from the surface of the conductive path structure in a direction that is opposite to the pressing direction.

2. The sensor unit according to claim 1, wherein the elastic structure that is elastically compressed is configured to be inserted into the housing section together with the conductive path structure that is connected to the sensor element and is mounted on the detection object.

3. The sensor unit according to claim 2, wherein
the sensor element is a temperature sensor to detect a temperature of the detection object, and
a plate is mounted on a back surface of the conductive path structure.

4. The sensor unit according to claim 3, wherein the plate is a metal plate having thermal conductivity.

5. The sensor unit according to claim 2, wherein the elastic structure is disposed adjacent and around the sensor element and on the conductive path structure.

6. The sensor unit according to claim 5, wherein a mold section made of resin and that covers the sensor element is disposed between the elastic structure and the sensor element.

7. The sensor unit according to claim 5, wherein a cover that covers an entirety of the elastic structure and the sensor element is disposed on a portion of the elastic structure on an opposite side from the conductive path structure.

8. The sensor unit according to claim 7, wherein the cover includes a body section that is closely contacted with the conductive path structure and a guide section that extends from a front edge of the body section with respect to an insertion direction into the housing section toward the conductive path structure while being inclined.

9. The sensor unit according to claim 5, wherein
the conductive path structure includes a bendable structure that extends from a position where the elastic structure is disposed so as to be bent, and
a second elastic structure is disposed on the surface of the conductive path structure via the bendable structure, and the second elastic structure is to be disposed on top of the elastic structure.

10. The sensor unit according to claim 9, wherein a protection plate is mounted on a back surface of a portion of the conductive path structure on which the second elastic structure is disposed.

11. The sensor unit according to claim 1, wherein the sensor element is covered with the elastic structure.

12. A sensor unit to be mounted in a housing section included in a detection object, the sensor unit comprising:
a conductive path structure including a conductive path and having flexibility and a band-like shape;
a sensor element connected to the conductive path on a surface of the conductive path structure; and
an elastic structure disposed on the surface of the conductive path structure so as to be elastically deformable, the elastic structure is configured to be elastically compressed within the housing section to press a back surface side portion of the conductive path structure toward the detection object by a resilient force, wherein
the elastic structure that is elastically compressed is configured to be inserted into the housing section together with the conductive path structure that is connected to the sensor element and is mounted on the detection object,
the elastic structure is disposed adjacent and around the sensor element and on the conductive path structure,
a cover that covers an entirety of the elastic structure and the sensor element is disposed on a portion of the elastic structure on an opposite side from the conductive path structure, and
the cover includes a body section that is closely contacted with the conductive path structure and a guide section that extends from a front edge of the body section with respect to an insertion direction into the housing section toward the conductive path structure while being inclined.

* * * * *